Feb. 19, 1924. 1,484,003
G. BENNETT
CIDER MILL
Filed April 7, 1921 5 Sheets-Sheet 2

GEORGE BENNETT.
INVENTOR.
BY
ATTORNEY.

Feb. 19, 1924.  
G. BENNETT  
CIDER MILL  
Filed April 7, 1921  
1,484,003  
5 Sheets-Sheet 4

GEORGE BENNETT.  
INVENTOR.  
BY *E. H. Bond*  
ATTORNEY.

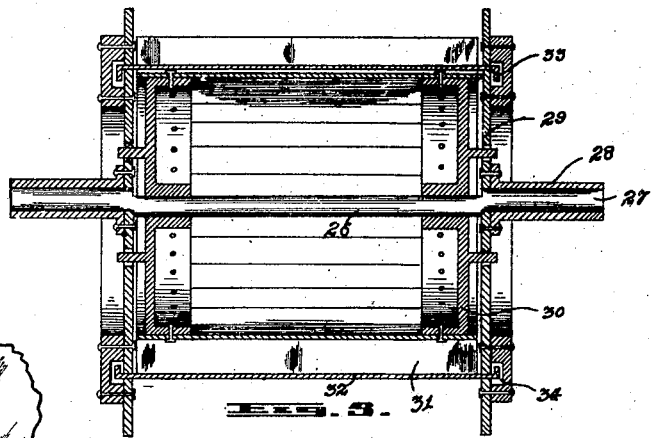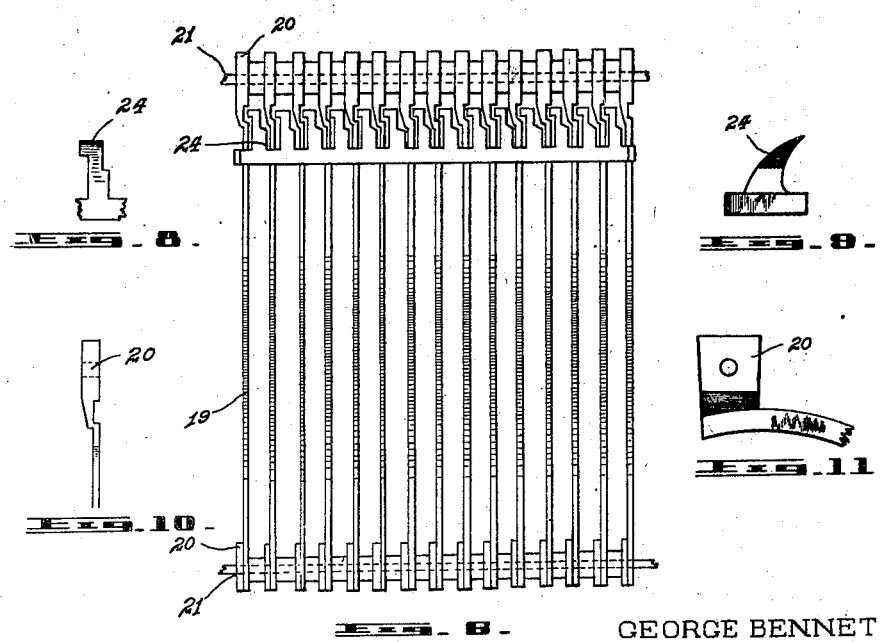

Patented Feb. 19, 1924.

1,484,003

UNITED STATES PATENT OFFICE.

GEORGE BENNETT, OF PORT HOPE, ONTARIO, CANADA.

CIDER MILL.

Application filed April 7, 1921. Serial No. 459,418.

*To all whom it may concern:*

Be it known that I, GEORGE BENNETT, a citizen of the Dominion of Canada, residing at Port Hope, in the county of Durham and Province of Ontario, have invented certain new and useful Improvements in Cider Mills, of which the following is a specification.

The present invention relates to improvements in cider mills and particularly refers to the mode of compressing the apples. The object of the invention is to provide means which will effectively compress the apples with a small amount of power.

In order that the nature of my invention will be properly understood, I have illustrated preferred embodiments of the same which will now be described, after which the novel features will be pointed out in the appended claims.

Fig. 5 is a longitudinal section of one of the compression drums.

Fig. 6 is a fragmental detailed plan view of the hopper bars illustrating one of the cutters disposed therein.

Fig. 7 is a fragmental detail of one of the members utilized to engage the compression drums with the outer ends thereof.

Fig. 8 is a front elevation of one of the teeth disposed on the cutter.

Fig. 9 is a side elevation of the same.

Fig. 10 is a fragmental end elevation of one of the hopper bars, and

Fig. 11 is a fragmental side elevation of the same.

Referring to the drawings, like numerals designate like parts in the various drawings.

Figure 1:
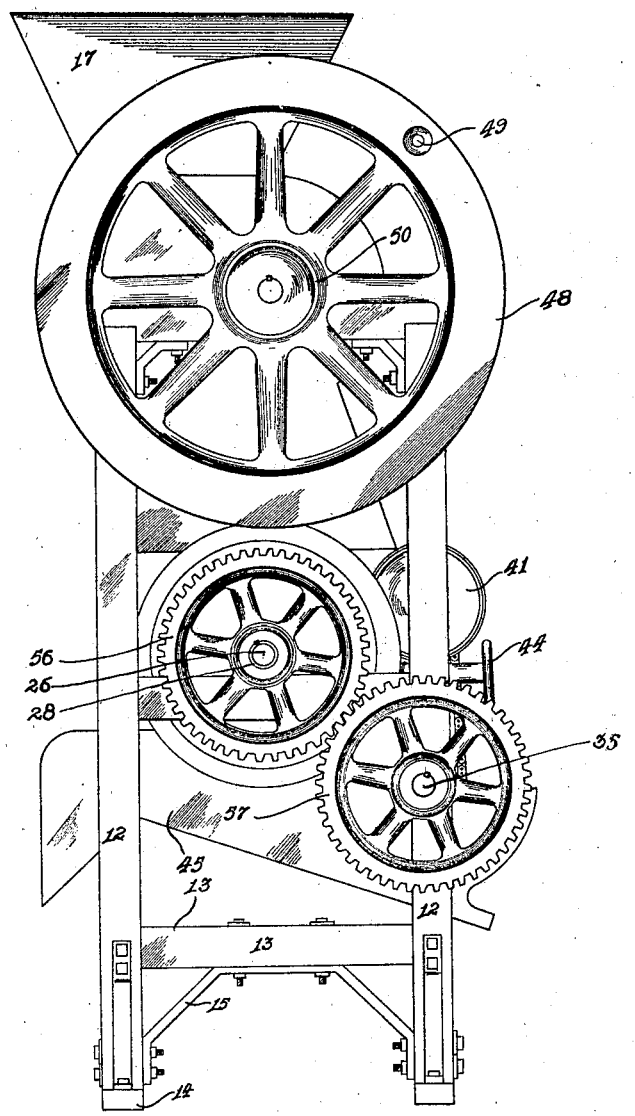
Figure 1 is a side elevation of the cider mill.
Figure 2:
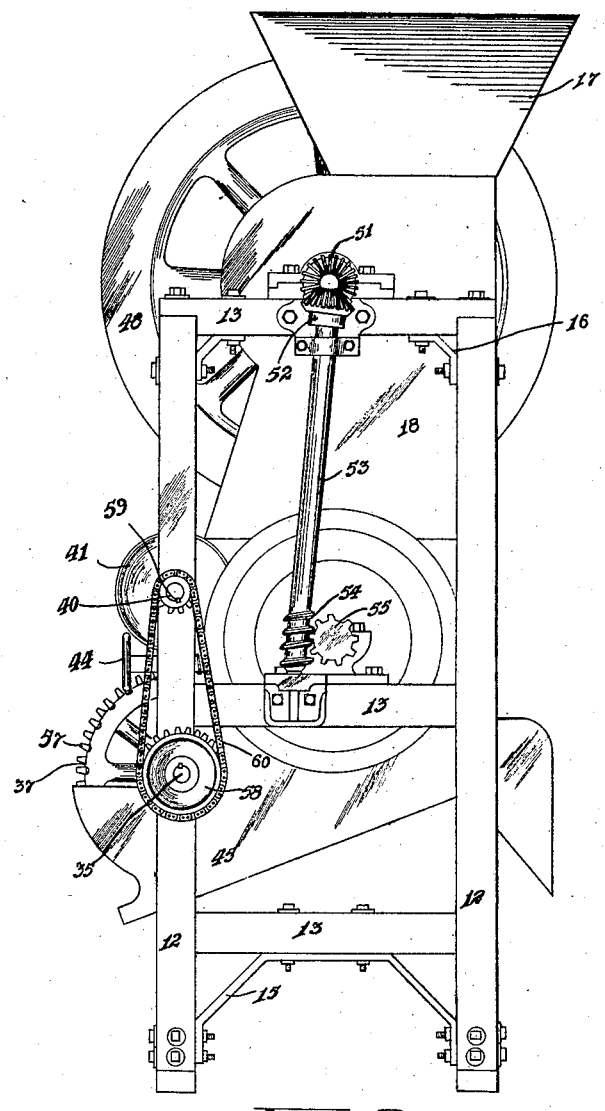
Fig. 2 is a side elevation of the opposite side of the cider mill.
Figure 3:
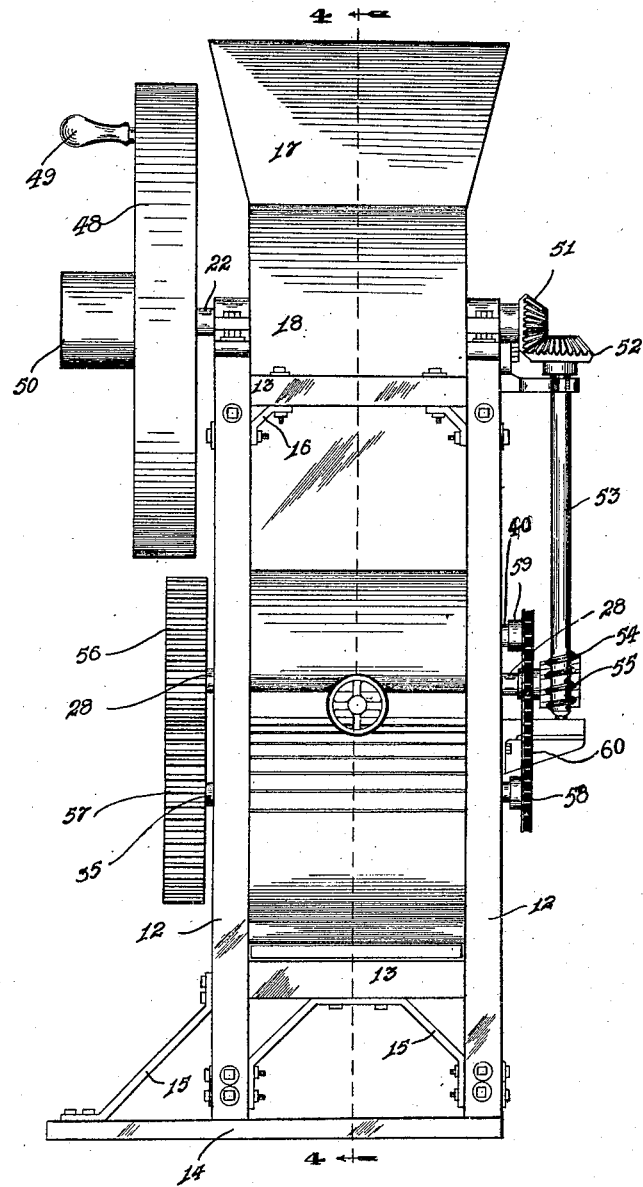
Fig. 3 is a front elevation of the cider mill.

The frame is composed of upright members 12, suitably connected by a plurality of horizontal bars 13, and base members 14. Brace members 15 and 16 are substantially bolted to the upright members 12 and bars 13 to hold the same rigid.

The hopper 17 is preferably constructed of wood and tapers in its lower extremity. It is substantially mounted on a metallic casing 18, which houses the grinding members, composed of a plurality of arcial knife bars 19, the ends of which are configurated to form lugs 20, which are apertured and bolted together by means of bolt members 21. A horizontal shaft 22 journalled near the upper extremity of the frame has a plurality of wheel members 23 mounted thereon only one being shown, the others being concealed thereby in Figure 4. Intermediately disposed between these wheels are a plurality of knife or cutter members 24, which pass between the knife bars 19 and cut or bite the apples.

A rectangular hopper 25 is disposed beneath the grinding members for the reception of the ground apples.

The main or primary compression drum is disposed beneath the hopper 25 and is mounted on a transverse drive shaft 26, the ends 27 of which are eccentric and are journalled in sleeve members 28 disposed on the end members 29 of the drum. The sleeve members 28 are journalled in bearings mounted on bars 13. This primary drum is composed of end wheels 30 which are keyed to the drive shaft 26.

A plurality of bars 31 forming a drum are suitably mounted on wheels 30. An annular casing 32 is disposed circumferentially about the drum and transverse slots disposed therein. The bars 31 of the drum pass through these slots. The ends 33 of the annular casing are flanged centrally at right angles and are disposed in an annular race 34 bolted on the end members 29. It is obvious that the annular casing being disposed supported indirectly on the eccentric ends 27, will cause eccentric rotation of the annular casing 32 in alinement with the bars 31. This eccentric rotation is utilized for gradually intensifying the compression of the annular casing against the ground apples.

Figure 4:
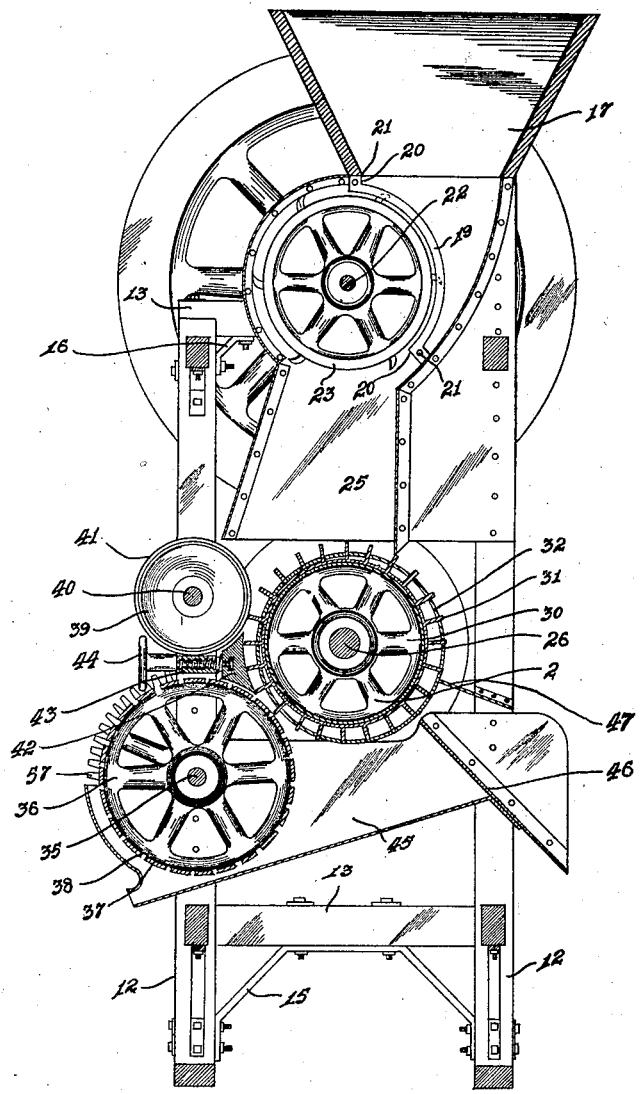
Fig. 4 is a vertical section on line 4—4 of Fig. 3, looking in the direction indicated by the arrows.

The secondary drum is mounted on a transverse shaft 35, which is journalled in the upright members 12. Wheels 36 only one of which can be seen in Figure 4 are keyed to the shaft 35 and have an annular casing 37 circumferentially disposed thereon. A plurality of transverse slots 38 are formed in the casing 37 for reception of the extended edges of the bars 31 disposed on the primary drum. A small compression drum is journalled immediately above the secondary drum and is constructed of a plurality of wheel members 39 only one of which can be seen in Figure 4 mounted on a transverse shaft 40. An annular casing 41 is disposed circumferentially about the wheel members and secured to them. The function of this annular casing is to press the ground apples as they fall into the troughs formed between the bars 31 on the primary drum.

A compression member 42 is disposed between the secondary drum 37 and the small compression drum 44. This member is configurated to conform with the circumferences of the compressing drums between which it fits and is tensioned inwardly by a coil spring 43. This compression member is adjustable by the screw member 44, with suitable handle at its outer end. The function of this member 42 is to press the ground apples in the troughs disposed on the primary drum.

A hopper 45 is disposed beneath the compression members for the reception of the apple juice. A slide 46 is disposed at the rear of the trough, and has a scraper 47 disposed immediately above it. The compressed apple sticks to the annular casing 32 until it passes the upper end of slide member 46. It is then scraped off by scraper 47, and deposited in a receptacle placed under the slide 46.

A fly wheel 48 is mounted on the end of the transverse drive shaft 22. This fly wheel has a handle 49 disposed on it for manual actuation. A pulley 50 is also mounted centrally on this fly wheel so that the mill may be driven by motive power.

A mitre gear 51 is keyed on the opposite end of the transverse drive shaft 22 and meshes with a mitre gear 52 keyed to an upright drive shaft 53. A worm 54 is mounted on the lower extremity of the upright drive shaft 53 and meshes with a gear 55 mounted on transverse shaft 26. On the opposite end of this shaft is keyed a gear 56 which meshes with spur gear 57 keyed to transverse shaft 35. On the opposite end from this spur gear 57 is keyed a sprocket wheel 58 and drives sprocket wheel 59 keyed to transverse shaft 40, by means of endless chain member 60.

The mode of operation is as follows:—
The apples are dumped into the hopper member 17 and fall on the knife bars disposed beneath. The cutter members 24 pass between these bars and cut or bite the apples which then fall into hopper 25. The parts of the apples fall into the troughs disposed on the primary drum. The rotation of this drum compresses the ground apples by means of the eccentrical rotation of its annular casing. The compression of the ground apples squeezes the juice into hopper 45, and from there it runs into a receptacle placed under the spout. The compressed apples cling to the annular casing 32, and are scraped off by scraper 47 and fall on to slide 46, which conducts them to a receptacle placed beneath it.

From the foregoing it is thought that the construction of my invention will be clearly understood, and, therefore, a more extended explanation has been omitted.

What I claim as new is:

1. A device of the character described, comprising in combination a frame composed of upright members, members connecting the said upright members, a hopper member disposed on the upper extremity of the said frame, a reservoir hopper disposed for reception of cut apples, spaced side wheels having outwardly extending hollow sleeves positioned centrally on their outer sides, a primary drum mounted on a transverse shaft, the ends of last shaft being eccentrically journaled in said sleeves, a plurality of wheels mounted on the said transverse shaft, an annular casing circumferentially disposed about the said drum having slots therein, the said annular casing being mounted on the said spaced side wheels which rotate on the eccentric ends of the said transverse shaft, imparting an eccentric motion to the annular casing in alinement with the said drum, the said eccentric movement serving to gradually increase the compression on the ground apples.

2. A device of the character described, comprising in combination a frame composed of upright members, members connecting the said upright members, a reservoir hopper disposed for reception of ground apples, annular end members having sleeve members centrally disposed on their outer face, a primary drum mounted on a transverse shaft, the ends of said shaft being eccentrically journaled in sleeves of said end members, said drum consisting of end wheels and a plurality of bars disposed on said end wheels, an annular casing circumferentially disposed about the said drum having transverse slots for reception of the extended edges of said bars, the said annular casing being mounted on the said end members which rotate on the ends of the said transverse shaft imparting an eccentric motion to the annular casing in alinement with the said drum, a secondary drum mounted on a transverse shaft journaled in said upright members, comprising a plurality of wheels keyed to the said transverse shaft, an annular casing mounted on said wheels, transverse slots in the said casing for reception of extended edge of said bars.

3. A device of the character described, comprising in combination a frame composed of upright members, members connecting the said upright members, a reservoir hopper disposed for reception of ground apples, annular end members having sleeve members centrally disposed on their outer face, a primary drum mounted on a transverse shaft, the ends of said shaft being eccentrically journaled in sleeves of said end members, said drum consisting of end wheels and a plurality of bars disposed on said end wheels, an annular casing circumferentially disposed about the said drum having transverse slots therein for reception of the extended edges of said bars, the said annular casing being mounted on the said end members which rotate on the eccentric ends of the said transverse shaft imparting an eccentric motion to the annular casing in alinement with the said drum, a secondary drum mounted on a transverse shaft journaled in said upright members, comprising a plurality of wheels keyed to the said transverse shaft, an annular casing mounted on said wheels, transverse slots in the said casing for reception of extended edges of said bars, and a compression drum disposed above the said secondary drum to press the apples against the primary drum.

4. A device of the character described, comprising in combination a frame composed of upright members, members connecting the said upright members, a reservoir hopper disposed for reception of ground apples, annular end members having sleeve members centrally disposed on their outer faces, a primary drum mounted on a transverse shaft, the ends of said shaft being eccentrically journaled in sleeves of said end members, said drum consisting of end wheels and a plurality of bars disposed on said end wheels, an annular casing circumferentially disposed about the said drum having transverse slots therein for reception of the extended edges of said bars, the said annular casing being mounted on the said end members which rotate on the eccentric ends of the said transverse shaft imparting an eccentric motion to the annular casing in alinement with the said drum, a secondary drum mounted on a transverse shaft journaled in said upright members, comprising a plurality of wheels keyed to the said transverse shaft, an annular casing mounted on said wheels, transverse slots in the said casing for reception of extended edges of said bars, and a compression drum disposed above the said secondary drum to press the apples against the primary drum, and an adjustably tensioned compression member disposed between the said secondary and compression drums.

5. A device of the character described, comprising in combination a frame composed of upright members, members connecting the said upright members, a reservoir hopper disposed for reception of ground apples, annular end members having sleeve members centrally disposed on their outer faces, a primary drum mounted on a transverse shaft, the ends of said shaft being eccentrically journaled in sleeves of said end members, said drum consisting of end wheels, and a plurality of bars disposed on said end wheels, an annular casing circumferentially disposed about the said drum having transverse slots therein for reception of the extended edges of said bars, the said annular casing being mounted on the said end members which rotate on the ends of the said transverse shaft imparting an eccentric motion to the annular casing in alinement with the said drum, a secondary drum mounted on a transverse shaft journaled in said upright members, comprising a plurality of wheels keyed to the said transverse shaft, an annular casing mounted on the said wheels, transverse slots in the said casing for reception of extended edges of said bars, and a compression drum disposed above the said secondary drum to press the apples against the primary drum, and an adjustably tensioned compression member disposed between the said secondary and compression drums, and a hopper disposed beneath the said compressing elements for reception of the juice pressed from the ground apples.

6. A device of the character described, comprising in combination a frame composed of upright members, members connecting the said upright members, a reservoir hopper disposed for reception of ground apples, annular end members having sleeve members centrally disposed on their outer face, a primary drum mounted on a transverse shaft, the ends of said shaft being eccentrically journaled in sleeves of said end members, said drum consisting of end wheels and a plurality of bars disposed on said end wheels, an annular casing circumferentially disposed about the said drum having transverse slots therein for reception of the extended edges of said bars, the said annular casing being mounted on the said end members which rotate on the ends of the said transverse shaft imparting an eccentric motion to the annular casing in alinement with the said drum, a secondary drum mounted on a transverse shaft journaled in said upright members, comprising a plurality of wheels keyed to the said transverse shaft, an annular casing mounted on the said wheels, transverse slots in the said casing for reception of extended edges of said bars, and a compression drum disposed above the said secondary drum to press the apples against the primary drum, and an adjustably tensioned compression member disposed between the said secondary and compression drums, and a hopper disposed beneath the said compressing elements for reception of the juice pressed from the ground apples, and a slide disposed at the rear of said hopper to conduct the compressed pulp to a receptacle.

In testimony whereof, I hereunto affix my signature in the presence of two witnesses.

GEORGE BENNETT.

Witnesses:
J. J. REID,
J. B. COLEMAN.